UNITED STATES PATENT OFFICE.

THEODOR S. WENNAGEL, OF HAMBURG, GERMANY, ASSIGNOR TO FIRM NAAMLOOZE VENNOOTSCHAP HOLLANDSCHE PROTEINE MAATSCHAPPIJ, OF AMSTERDAM, NETHERLANDS.

CONDENSATION PRODUCT OF PHENOLS AND FORMALDEHYDE.

1,197,316.  Specification of Letters Patent.  Patented Sept. 5, 1916.

No Drawing.  Application filed July 30, 1915.  Serial No. 42,752.

*To all whom it may concern:*

Be it known that I, THEODOR SETH WENNAGEL, a subject of the German Emperor, residing at Hamburg, in the German Empire, have invented certain new and useful Improvements in Condensation Products of Phenols and Formaldehyde, of which the following is a specification.

Phenol aldehyde condensation products are known in many varieties. However, most of these products show considerable defects, often they are very brittle and accompanied by disagreeable odors. However, their manufacture has met with many not inconsiderable difficulties. These defects are obviated by the method now to be described. According to this new method elastic and eventually odorless products are obtained which can be easily manufactured. It has already been proposed to employ neutral soaps as condensation means for the purpose of increasing the elasticity but the success was doubtful, especially since the disagreeable odor could not be removed, but on the contrary, was increased.

While the quantity of alkali employed has been heretofore estimated as sufficient at less than ½ equimolecular of the weight of the phenol employed, *i. e.* less than one fifth of the amount of alkali which would be required to convert all the phenol used into its alkali compound, or while neutral soaps have been used as proposed by others, my experiments have, in a surprising way shown that by employing large quantities of the base, preferably double the quantity of the base required for saponifying the fatty substances, one can obtain a product which shows considerably improved properties, compared with the known products. The product obtained by my method is highly elastic and does not melt. According to my invention one is furthermore enabled by the use of large quantities of base to employ with advantage the triglycerids of fatty or oily acids and especially unsaturated acids, whereas formerly only fatty or oily acids have been used. Thus a further increase in the elasticity and firmness of the product is reached. Moreover, the use of large quantities of alkali makes it possible to make the product odorless merely by the addition of resin, such as colophony and the like. Preferably the proportions are so selected that equal parts in weight of resin and oil are used. Finally in my method the oil can be entirely omitted and resin only can be used for saponification when products of less elasticity are to be manufactured. Thus one obtains clear and transparent products which are entirely odorless. It may be mentioned also that for the manufacture of large mold parts, solid plates and the like, it is of great importance to obtain a relatively great elasticity, since such parts, because of their own tension, are inclined otherwise to tear or crack. It is the opinion of the inventor that, on account of the large quanties of alkali, there occurs at the beginning a hydrolytic decomposition of the oils, or the resins. Consequently in the method employed according to my invention, the formaldehyde is only added after the decomposition is completed. This is essential for the carrying out of my new method as otherwise the decomposition might be interfered with.

A few examples of my new method are stated herewith:

1. 100 parts in weight of a phenol (cresol, etc.,) are added to from 25 to 50 parts of a triglycerid of an unsaturated sebacic acid and 48 to 96 parts in weight of a 20% solution of hydrate of potassium, or 34, 25 to 69.5 parts in weight of a 20% solution of caustic hydrate of sodium, and are boiled for at least one hour; then 50 parts in weight of 40% formaldehyde are added, and the water contained in the alkali solution and in the formaldehyde is distilled, whereupon the substance may be poured into molds. The substance thus far obtained is then hardened in the well known manner either by being dried under pressure, or in open molds or in presses, and after the hardening it does not melt and has a high resistance against chemical actions.

2. 100 parts in weight of phenol, 25 parts in weight of oil, 25 parts in weight of resin (colophony) and 94 parts in weight of a 20% solution of hydrate of potassium are added one to the other and then treated as described under 1. The final product is odorless, even during its manufacture.

3. 100 parts in weight of phenol, 100 parts in weight of resin and 112 parts in weight of a 20% solution of hydrate of potassium are treated as under 1. This composition will result in a clear transparent and odorless product.

While these examples of my new method produce very favorable results, other proportions can, of course, be selected and the products can moreover be provided with filling-materials of various kinds before being molded or cast.

I claim:

1. A product of condensation of phenol, aldehydes and fatty or oily substances containing alkali in double the quantity required for the saponification of the fatty or oily substances.

2. A product of condensation of phenol, aldehydes and triglycerids of fatty or oily acids containing alkali in double the quantity required for the saponification of the triglycerids of fatty or oily acids.

3. A product of condensation of phenol, aldehydes, fatty or oily substances and resin, the resin being preferably equal in quantity as the fatty or oily substances, the product containing alkali in double the quantity required for the saponification of the fatty or oily substances and the resins.

4. The method of producing a product of condensation as described which consists in adding to phenol, aldehydes and fatty or oily substances alkali in double the quantity required for the saponification of the said fatty or oily substances, distilling the water contained in the aldehyde and in the alkali solution, and then casting the mass into molds.

5. The method of producing a product of condensation as described, which consists in adding to phenol, aldehydes and triglycerids of fatty or oily acids alkali in double the quantity required for the saponification of the said triglycerids of fatty or oily acids, distilling the water contained in the aldehyde and in the alkali solution, and then casting the mass into molds.

6. The method of producing a product of condensation as described which consists in adding to phenol, aldehydes and fatty or oily substances and resins, the latter being preferably equal in quantity to the fatty or oily substances, alkali in double the quantity required for the saponification of the said fatty or oily substances, and the resin, distilling the water contained in the aldehyde and in the alkali solution and then casting the mass into molds.

7. The process of producing a product of condensation as described, which consists in mixing together 100 parts in weight of phenol, from 25 to 50 parts of a triglycerid of an unsaturated sebacic acid, and 48 to 96 parts in weight of a 20% solution of hydrate of potassium, boiling the mixture, then adding 80 parts in weight of 40% formaldehyde, distilling the water contained in the formaldehyde and in the alkali solution and then casting the mass into molds.

TH. S. WENNAGEL.

Witnesses:
Francis R. Stewart,
Charles A. Halley.